United States Patent [19]

Cutler et al.

[11] Patent Number: 5,122,062

[45] Date of Patent: Jun. 16, 1992

[54] ELECTRONIC TEACHING APPARATUS

[76] Inventors: Burton Cutler, 19560 S. Rancho Way, Dominguez Hills, Calif. 90220; Stanley Cutler, 15354 Oxnard St., Van Nuys, Calif. 91411

[21] Appl. No.: 599,724

[22] Filed: Oct. 19, 1990

[51] Int. Cl.$^5$ .............................................. G09B 3/00
[52] U.S. Cl. ...................................... 434/327; 434/335
[58] Field of Search ............... 434/335, 308, 309, 311, 434/312, 313, 317, 318, 322, 327, 384

[56] References Cited

U.S. PATENT DOCUMENTS

| | | | |
|---|---|---|---|
| 4,164,078 | 8/1979 | Goldfarb | 434/335 |
| 4,179,822 | 12/1979 | Clark | 434/335 |
| 4,303,398 | 12/1981 | Yoseloff | 434/335 |
| 4,449,941 | 5/1984 | McGuire | 434/335 |
| 4,474,557 | 10/1984 | Clossey | 434/335 |
| 4,609,359 | 9/1986 | Erickson | 434/335 |
| 4,664,634 | 5/1987 | Cutler | 434/335 |
| 4,729,564 | 3/1988 | Kuna | 434/335 |
| 4,781,598 | 11/1988 | Cutler | 434/327 |
| 4,898,537 | 2/1990 | Pryor | 434/335 |
| 4,921,427 | 5/1990 | Dunn | 434/335 |
| 4,978,302 | 12/1990 | Clossey | 434/335 |

FOREIGN PATENT DOCUMENTS

| | | | |
|---|---|---|---|
| 2303333 | 6/1975 | France | 434/335 |
| 2541023 | 8/1984 | France | 434/335 |

Primary Examiner—Robert Bahr
Attorney, Agent, or Firm—Roger A. Marrs

[57] ABSTRACT

An electronic educational teaching apparatus is disclosed herein for use in learning key subjects such as geography, which has an information card presenting visual question and answer data and supported in a holder or stand which houses an electronic circuit for comparing user input answer data with memory stored correct answer data. In one form, the apparatus includes a microprocessor employed with an input keyboard for entering answer data and an output display to indicate answer results. Internal circuits compare the user input answer data with the stored correct answer data and with interconnecting circuits to sense right and wrong answers with alarm, display and score registering capability. The keyboard input is processed by the microprocessor, then coupled to LED displays via LED drivers. An audible device is connected to the microprocessor for providing audible indications of answer correctness. Power supply circuits, including D.C. regulation circuits, reset and timing circuits are operably interconnected with the microprocessor.

4 Claims, 3 Drawing Sheets

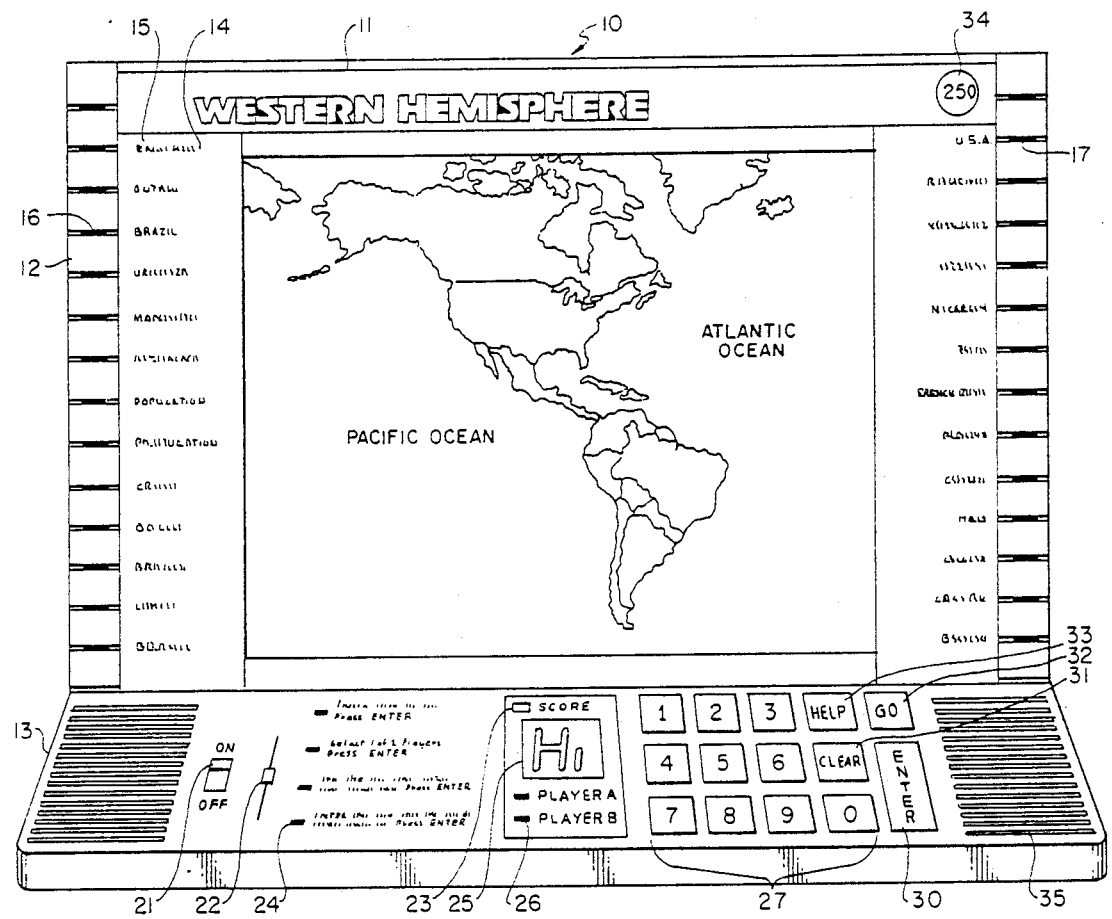
FIG. 1.
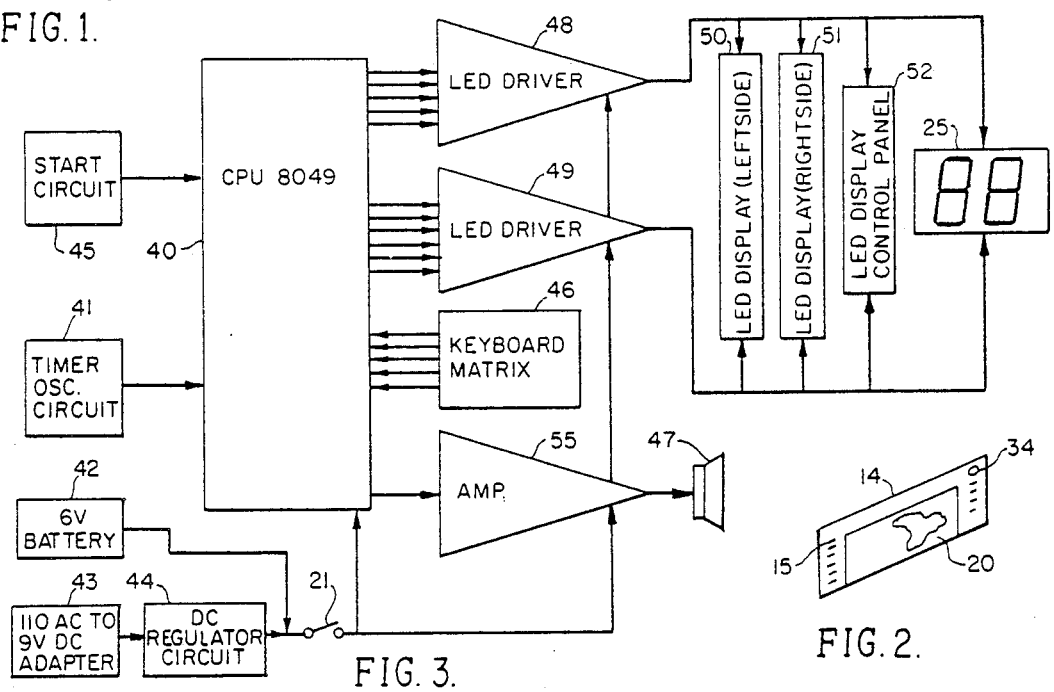
FIG. 3.
FIG. 2.

ELECTRONIC TEACHING APPARATUS

BACKGROUND OF THE INVENTION

1. Field of the Invention

The present invention relates to the field of electronic educational training and learning devices and more particularly to a novel electronic learning apparatus useful in educating users in a variety of subjects such as geography by providing stored correct answers to printed questions and which further includes means for comparing user answers to the stored answers with visual and audible indication of correctness.

2. Brief Description of the Prior Art

Conventional apparatus has been used in the past for training or assisting pupils in learning a variety of subjects. The more common subject is that of arithmetic or general information relating to general subjects. In most instances, teaching machines or learning apparatus has avoided the field of geography. In practice, the conventional devices have been found to be detrimental to the learning process as giving rise to discouragement and lack of continued incentive due to displays being either solely audible or solely visual and further lacking in scorekeeping ability as well as interchangeability of subject information.

Therefore, a long-standing need has existed to provide a novel learning apparatus which incorporates a plurality of selected subject matter sheets or cards displaying information to be chosen by the user for learning purposes. The apparatus should provide means for comparing selected information on the card with internally stored information whereby correctness of comparison may be simultaneously indicated visually and audibly. Scorekeeping means should be responsive to answer result for immediate or delayed presentation via suitable display means.

SUMMARY OF THE INVENTION

Accordingly the above difficulties and problems are obviated by the present invention which provides a novel educational apparatus for training pupils in geography or the like which includes a microprocessor having memory circuits for storing a quantity of answer information and a variety of routines and subroutines so that answer information placed through a keyboard matrix is compared with the stored information and the result of a comparison is introduced to LED display devices and a digital display via LED driver circuits. The information may be displayed by visual and audible means responsive to LED, driver and display driver circuits via the microprocessor which is under control of a start circuit, a clock pulse circuit and a keyboard input. A suitable power supply is connected to the microprocessor as well as to the driver and display means. A feature of the invention includes a display card having an index for registration with the microprocessor and wherein the card displays geographic information including a plurality of answer indicia intended to be selected by the user which is introduced to the microprocessor by the keyboard matrix.

Therefore, it is among the primary objects of the present invention to provide an educational device which improves the user's learning process so that the user is encouraged to learn the subject matter being presented by the apparatus.

Another object of the present invention is to provide a novel educational training apparatus which includes answer indicia on a card which is held by the apparatus and wherein the user selects certain data for introduction to a microprocessor via a keyboard matrix for comparison with stored answers so that an audio and visual display of comparison results is provided to the user.

Still another object of the present invention is to provide a novel educational device wherein the apparatus is interrogated by the user through a keyboard matrix and comparison of input information is made with stored information for ultimate visual and audio review by the user and wherein scorekeeping means are incorporated as well as provision for one, two or more players or users to participate.

A further object of the invention resides in providing an educational apparatus responsive visually and audibly to a compared output between stored data and keyboard entered data indicative of right or wrong answers to questions carried on a display card so as to be informative and self-correcting.

Another object of the invention is to provide an educational teaching aid or accessory wherein one or two players or teams can participate in a game used to either teach or quiz factual information such as geographical or the like.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front elevational view of the educational training apparatus of the present invention;

FIG. 2 is a reduced perspective view of a typical card used in connection with the stand of the apparatus shown in FIG. 1;

FIG. 3 is a block diagram of the electronic circuit including the microprocessor used in the apparatus of FIG. 1;

DESCRIPTION OF THE PREFERRED EMBODIMENT

Figure 4:
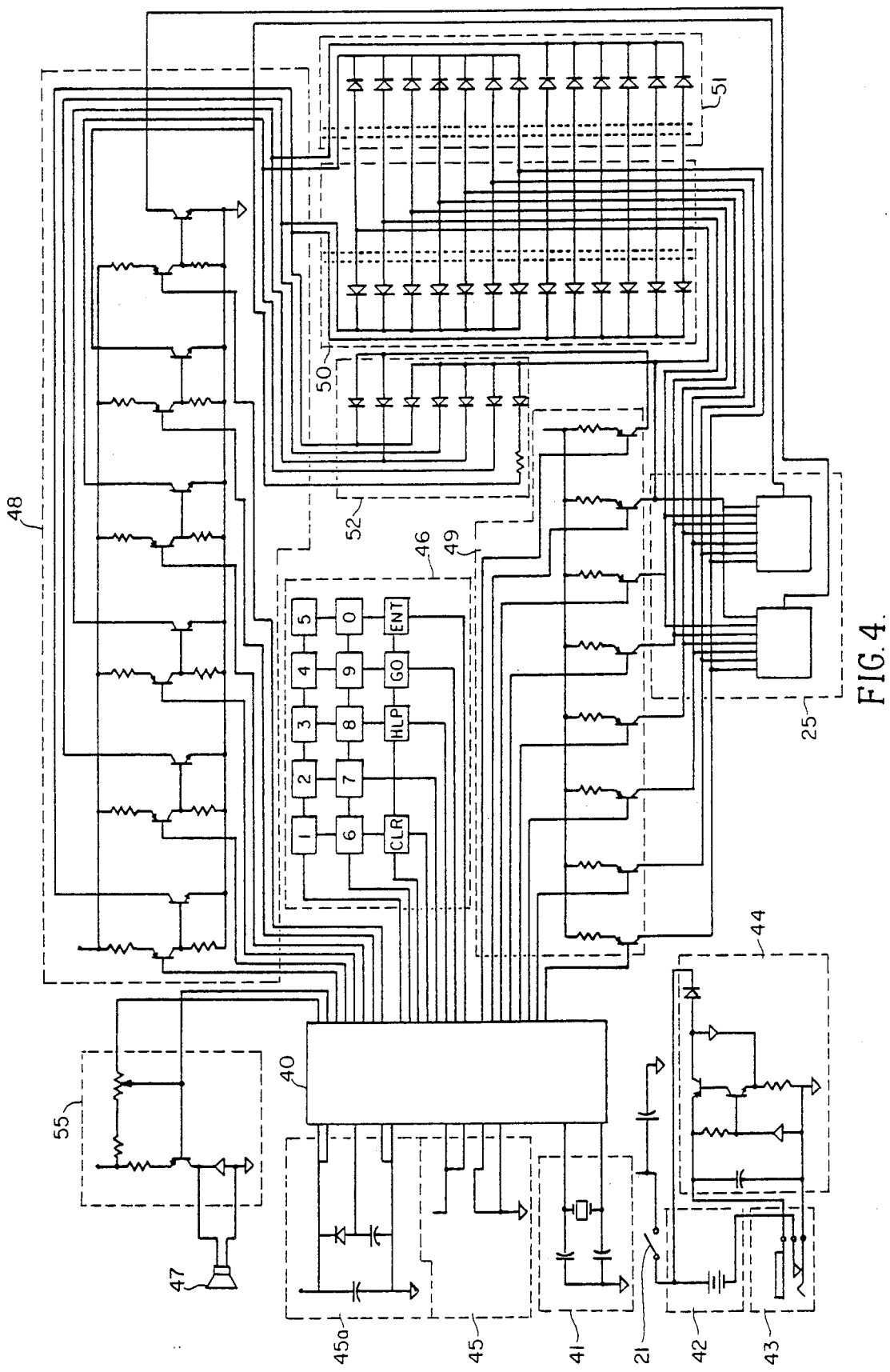
FIG. 4 is a schematic drawing of the circuit used in the block diagram of FIG. 3.

The invention herein disclosed is not dependent on any particular shape or form of teaching or learning apparatus, but may be practiced broadly in different contexts and employing different equipment. However, a comprehension of the invention is believed to be facilitated by the disclosure of a specific apparatus in a particular form and with certain components to which reference may be had in the further course of this disclosure. Accordingly, a preferred form of teaching apparatus is illustrated in the general direction of arrow 10 in FIG. 1 for illustrative purposes.

The apparatus 10 includes a housing having a front panel 11 which includes an upright back 12 and a forwardly projecting base 13. The upright back 12 includes a central area for supporting one of a selected number of question cards 14 having a plurality of questions 15 located on opposite edge marginal regions on the sides of the card in a spaced manner. A map code 34 is included so that a variety of cards 14 may be placed on the stand 11 and the apparatus can sense the map code so as to index or register with internal circuits. The questions are in a vertical row and spaced apart so as to provide a visual presentation which is uncluttered and readable. The extreme edge marginal regions of the upright back have a stand including a plurality of spaced-apart lights, such as light 16 adjacent to the question "Brazil" in the vertical array of questions on one side of the card 14. Similar lights are placed along the opposite edge marginal region of the upright back or stand, such as light 17 opposite the question "USA". The center of the card 14 includes geographical subject matter, such as a map with a plurality of numbers thereon representing possible answers. Once such number is indicated by numeral 18 and it is important to note that the numeral represented by nomenclature 18 identifies the country of "Brazil". Therefore, the answer to the question "Brazil" would be the number identified by numeral 18. This relationship is continued for all questions which are related to the remainder of the numbers on the map portion of the card 14. The map portion in the center of the card is broadly indicated by numeral 20.

An ON/OFF switch 21 is carried on the base 13 as well as a volume control 22 and a score indicator 23. Step-by-step operating instructions 24 are included, as well as a display window 25 which shows programming information and answers entered into the apparatus and scores. Player lights 26 are included which show which player should answer the next question and which player's score is being displayed in the window 25. A number of keys running from 0 to 9 is located on the base 13 and is broadly indicated by the numeral 27. Function keys are also included, such as an enter key 30 which when depressed, enters, for example, the selected numbers for codes introduced to the apparatus via the numerical keys 27. Other functions entered may include number of players, time allowed to respond with correct answer, answers, etc. A function clear key 31 is included which is depressed once if the wrong answer is introduced to the apparatus through the keyboard and if the player would like to change the answer before pressing enter key 30. To end the game and begin a new one, the clear key is pressed twice.

Another function key is indicated by numeral 32 which is called the "GO" key. By pressing this key, the game is started or the next question is chosen. A help function key 33 is provided. By pressing this key, the correct answer is revealed whenever the player is uncertain or the player wishes to know the answer.

The loudspeaker may be placed on the base 13 and is preferably under a grid or grill 35.

Referring now in detail to FIG. 2, a question card is illustrated and is indicated by numeral 14 as previously described with respect to FIG. 1. The card is separate and may be withdrawn from a stack of different geographic cards by the player at the beginning of the game or instruction procedure. The card is taken from the stack and placed between the edge marginal regions of the upright back 12 so that the questions along each side of the card will appear adjacent to a light 16.

Referring now to FIG. 3, a block diagram of the electronic circuit included within the apparatus 10 is illustrated. The heart of this system is a microprocessor 40 which is manufactured by Intel under part #CPU8049. The microprocessor includes memory components for storing information, as well as control and signal circuits for extracting the information when called for by the player through the keyboard. The microprocessor is operated in accordance with an oscillator circuit serving as a clock pulse generator, as indicated by numeral 41, and power to the apparatus is by means of a 6-volt battery 42 or alternately from line voltage 43 which is processed through an AC to DC adaptor for DC regulation via circuit 44. A power switch 21 is included and is the same switch shown on the control base or panel in FIG. 1. An initiating circuit 45a starts the apparatus when power is applied by switch 21. Information is entered into the microprocessor 40 via the keys 27 operating through a keyboard matrix 46. The audible signal output from the microprocessor is provided to a loudspeaker 47 via a conventional amplifier 48. For visual display, output from the microprocessor is through LED drivers 48 and 49 and then through LED displays 50 and 51 for the lights 16 appearing on the right and left hand side of the upright back or stand 12. The LED display control circuit is indicated by numeral 52 and the programming information, answers and the like are visually displayed through the window 25.

Referring now in detail to FIG. 4, a schematic drawing is illustrated conforming to the block diagram shown in FIG. 3. The functional characteristics of the microprocessor 40 are contained in instruction sheets provided by Intel under part number CPU 8049. In general, the microprocessor is a single component microcomputer employing an arithmetic section containing the basic data manipulation functions and includes many sections such as an arithmetic logic unit, an accumulator, and an instruction decoder. In a typical operation, data stored in the accumulator is combined in the arithmetic logic unit with data from another source on the internal bus, such as a register, and the result is stored in the accumulator or another register.

The microprocessor 40 also includes 27 lines which can be used for input or output functions. These lines are grouped as three ports of eight lines each which serve as either inputs outputs or bidirectional ports. The keyboard matrix 46 inputs directly to the microprocessor and additional outputs are to the LED drivers 48 and 49 respectively. Output from the microprocessor is also to the amplifier 55 and to the speaker 47. A combination of output signals from the microprocessor to the LED displays 50, 51 and 52 turn on and off selected lights 16, 17 and 25. Indicator lights for functions are also turned on and off, such as the score indicator 23, as shown in FIG. 1. The amplifier 55 is a one-stage transistor impedance converter which allows pulses from the microprocessor to control power into the speaker. Also, the LED display 52 on the control panel or base 13 may be referred to as programming lights plus player a and b and score lights are included as well as time limit lights.

Figure 5:
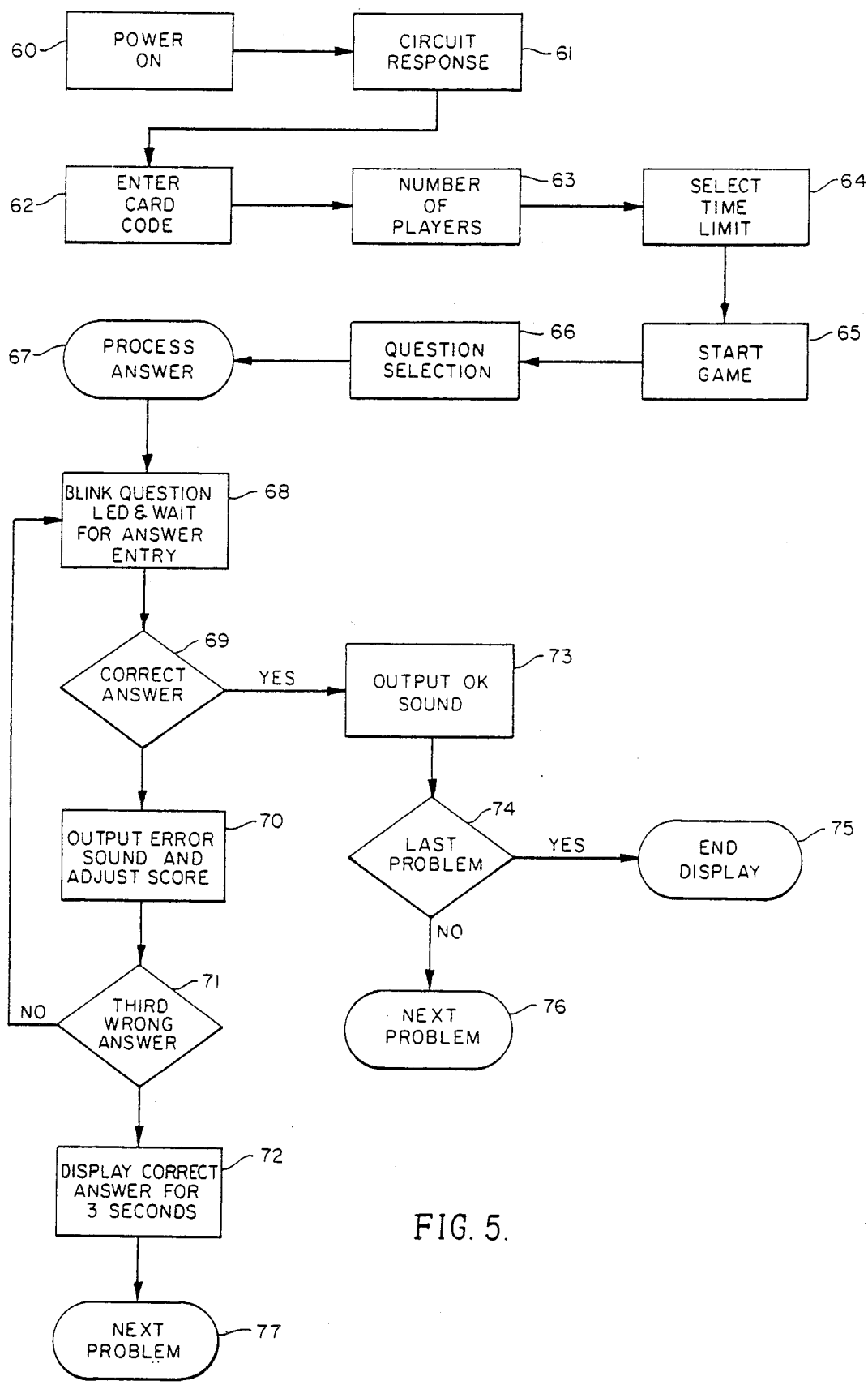
FIG. 5 is a flow diagram illustrating the sequence of operation for a typical question and answer retrieval procedure employing the apparatus of the present invention.

Referring to FIG. 5, a flow chart is illustrated showing the sequence of operation for the apparatus illustrated and described with respect to FIGS. 1–4 inclusive. Initially, power is applied to the power supply circuit, indicated by numeral 50, by actuation of power switch 21. For example, 6-volt battery 42 would then be connected directly to the apparatus. Next, a start-up program is initiated, as illustrated by circuit response box 61 wherein the response is a saluting "hi" display in the display window 25 and simultaneously, a musical note sequence simulating the word "hello" is sounded via the loudspeaker 47.

Next, one of four programming lights 24 on the panel blinks to request the user to enter a four-digit card code 34 printed on the lesson card 14 which has been inserted on the stand 12. The entry of the question card code is identified by numeral 62 in FIGURES and is by the keyboard 46 with the depression of the entry key 30 so that the code is introduced to the microprocessor memory.

A second blinking programming light on the front panel, as indicated by numeral 24, requests the player or user to advise if he is playing alone or with an adversary. The information is then entered by the appropriate key 27 and followed by the enter key 30 depression. The number of player entry and light indication is referred to by numeral 63 which is then followed by a third blinking programming light instructing the user to select a time limit for answering subsequent questions. After such time, if a question is not answered correctly, the circuit will display the correct answer, and adjust the user's score accordingly. This procedure is indicated by numeral 64 in the block diagram and the instructions are entered by the depression of the enter key 30.

After entering the information as discussed with respect to boxes 63 and 64, the display instructs the user to start the "game" as indicated by number 65 by depressing "go" key 32. This starts a random search for the first question to be answered from 1 to 26 questions on the associated map card 14. LED lights adjacent to the questions along the left and right edges of the card flash in random order accompanied by a variety of audio tones. After approximately two seconds, a particular question is selected by the circuit and the light adjacent to this question blinks to indicate that this is the question to be answered. Block 66 indicates question selection just described. All answers on the card are in the form of numbers which are then entered into the microprocessor through the keyboard by the player or user. The processing of the answer is indicated by numerals 67 and 68. If the answer is correct, as indicated by numeral 69, the circuit responds with a particular musical note sequence and adds to the user's score stored in the microprocessor memory. If the answer is wrong, as indicated by numeral 70, the user is advised by a "raspberry" tone, and a subtraction is made to the score. The user can then try again up to three times to answer correctly. If not answered correctly on the third try, the unit will display the correct answer and then return to the "go" mode. The third chance is indicated by numeral 71 and the correct display answer for three seconds is indicated by numeral 72.

Numerals 73 and 74 pertain to the correct answer and move the questioning procedure to the next question by ending the display 75 and moving to the next problem 76. The sequence for terminating the wrong answer results in moving to the next problem 77 after the previous corrections to score and the like.

If there are two players, the second player will now be alerted to answer the next question by a flashing light. The process of entering a new answer is then repeated again.

The circuit of the apparatus continues to select new questions and never repeats one previously processed until all questions have been answered. If all questions were answered correctly, and within the programmed time limit, the player is rewarded with a "victory" song and a LED "light show". At the same time, the player's final score is displayed. If one or more errors are made, or the time limit exceeded one or more times, the reward is only a portion of the "victory" song that is played and there is no "light show" and the less than perfect score is displayed.

At any time during the game, the player may interrogate the apparatus for the correct answer by pressing a "help" key 33. This action results in a subtracted score for that interrogating player.

When the game is completed, or at any time during the course of play, the user may return to the initial programming mode by pressing "clear" key 31 twice. Pressing this key only once allows any answer keyed in to be changed without penalty before the "enter" key 30 is pressed. A unique feature allows any map card code to be played continuously and automatically. This can be used at demonstrations, trade shows or the like, and to attract attention even though completely unattended by show personnel.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In an apparatus for matching memory stored questions with manually entered answers, the improvement comprising in combination:

a first storage means for storing a plurality of question and answer data;

a second storage means for storing a plurality of question and answer data identical to said question and answer data stored in said first storage means;

keyboard means operably coupled to said second storage means for entering selected singular answer data from said first storage means and comparing said entered data with said question and answer data in said second storage means;

circuit means response to comparison of said singular answer data with said question data to display indication of correctness and incorrectness;

said circuit means includes a display means having both audible means for sounding audible indications of correctness and incorrectness and visual means for simultaneously displaying visual indications of correctness and incorrectness in unison with said audible means;

said first storage means includes a coded card having an information surface imprinted with said plurality of question and answer data where said question data is in alpha language form and said answer data is in numerical form;

said circuit means includes a microprocessor having a ROM memory for storing said question and answer data of said second storage means;

means operated under the control of said microprocessor for supplying signals to said display means for indicating correctness of each keyboard entered answer data, said display means including means for indicating any incorrectness of entered answer data;

a housing enclosing said second storage means, said microprocessor, said circuit means and said display means;

said housing having a base panel and an upright stand support thereon with a central recess for accommodating said coded card in an upright position between opposite edge marginal regions defining said central recess;

said plurality of first storage means question data carried on opposite edge marginal regions of said card surface adjacent to said stand edge marginal regions wherein each question data is spaced apart in a pair of rows;

a plurality of lights operably disposed on said stand edge marginal regions in alignment and registry with said question data on said card; and said lights constituting a visual display of answer correctness.

2. The invention as defined in claim 1 wherein:

said card and said microprocessor include a coded symbol common to both for selecting a group of answers in said second storage means selected from said plurality; and said means for automatically indicating the correctness of an answer including a display which is illuminated to depict in the instance of a correct answer and an unpleasant noise in the case of an incorrect answer.

3. The invention as defined in claim 2 including:

means in said circuit means microprocessor for maintaining a player score based on correct and incorrect answers.

4. The invention as defined in claim 3 including:

timer means in said microprocessor selectively limiting player response time in answering questions by a player;

adjustment means in said timer means for setting a specific response time limit and penalty means included in said microprocessor for adjusting player score in the event of an incorrect answer.

* * * * *